Sept. 3, 1940.  W. BLACKMORE  2,213,575
JOURNAL BOX
Original Filed July 2, 1932   2 Sheets-Sheet 1

Inventor
William Blackmore
by Clarence D. Kerr
his Attorney

Sept. 3, 1940.  W. BLACKMORE  2,213,575
JOURNAL BOX
Original Filed July 2, 1932   2 Sheets-Sheet 2

Inventor
William Blackmore
by Clarence O. Kerr
his Attorney

Patented Sept. 3, 1940

2,213,575

UNITED STATES PATENT OFFICE 2,213,575

JOURNAL BOX

William Blackmore, Cleveland Heights, Ohio, assignor to National Malleable and Steel Casting Company, Cleveland, Ohio, a corporation of Ohio Original application July 2, 1932, Serial No. 620,682. Divided and this application September 9, 1936, Serial No. 99,942

4 Claims. (Cl. 308—80)

This invention relates to improvements in journal boxes and has particular reference to the provision of effective means for lubricating the bearing surfaces. The invention is especially concerned with a construction of the plain bearing type but certain of its features are applicable also to roller bearing boxes. This is a division of my pending application Ser. No. 620,682, filed July 2, 1932.

It is a primary purpose of the present invention to provide improved means for preventing the escape of lubricant from a journal box equipped with a forced or flood lubrication system, such as shown in the above-mentioned parent case. In said case there is disclosed a particularly effective arrangement by which a continuous flow of oil is maintained over the bearing surfaces at all speeds of rotation of the journal. Toward this end there is provided a chain of special construction carried by the journal and adapted to be kept in motion by the rotation of the journal to carry oil from a reservoir at the bottom of the box to distributing means at the top of the journal. A chain having a broad surface adapted to convey large amounts of oil is provided to supply adequate lubrication over a wide range of speeds. An important feature of the improved chain is its construction in such a way that it will not tend to cling to the under side of the journal and will function properly at all times. Moreover, the improved lubricating system, as disclosed in the parent case, involves a special construction of the brass for most effectively removing the oil from the chain and distributing it along the journal. While the improved sealing or retaining means of the present invention is particularly suited for use in connection with this improved lubrication system, it is also applicable to boxes equipped with other means for providing a suitable flow of lubricant over the bearing surfaces.

The trend in modern railroad practice toward higher speeds of operation has not only increased the need for adequate lubrication but this in turn has increased the difficulty of retaining the lubricant within the journal box. According to the present invention, this problem is effectively met by providing a special arrangement of surfaces within the box for insuring the return to the reservoir of any oil that attempts to escape at the inner end of the box. For this purpose the wedge is given a special formation at its inner end, adjacent the inner end of the box, whereby oil thrown from the journal by an obturating ring will be rapidly returned to the reservoir at the bottom of the box.

Other features and advantages of the invention will become apparent from the detailed description of an illustrative embodiment of the same, which will now be given in conjunction with the accompanying drawings, in which.

Figure 1:
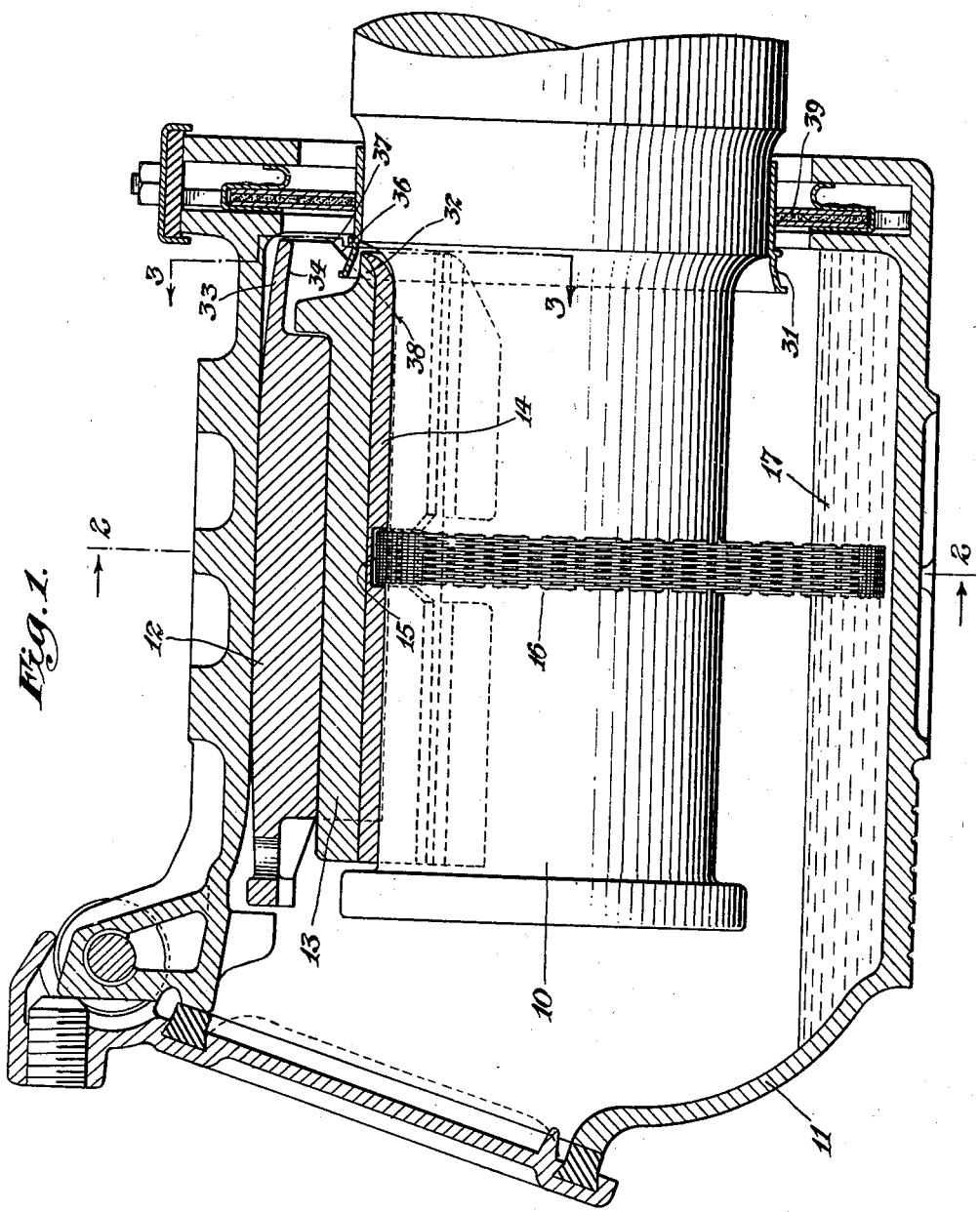
Figure 1 is a longitudinal, central, vertical section through a box embodying the invention, applied to the end of an axle.
Figure 2:
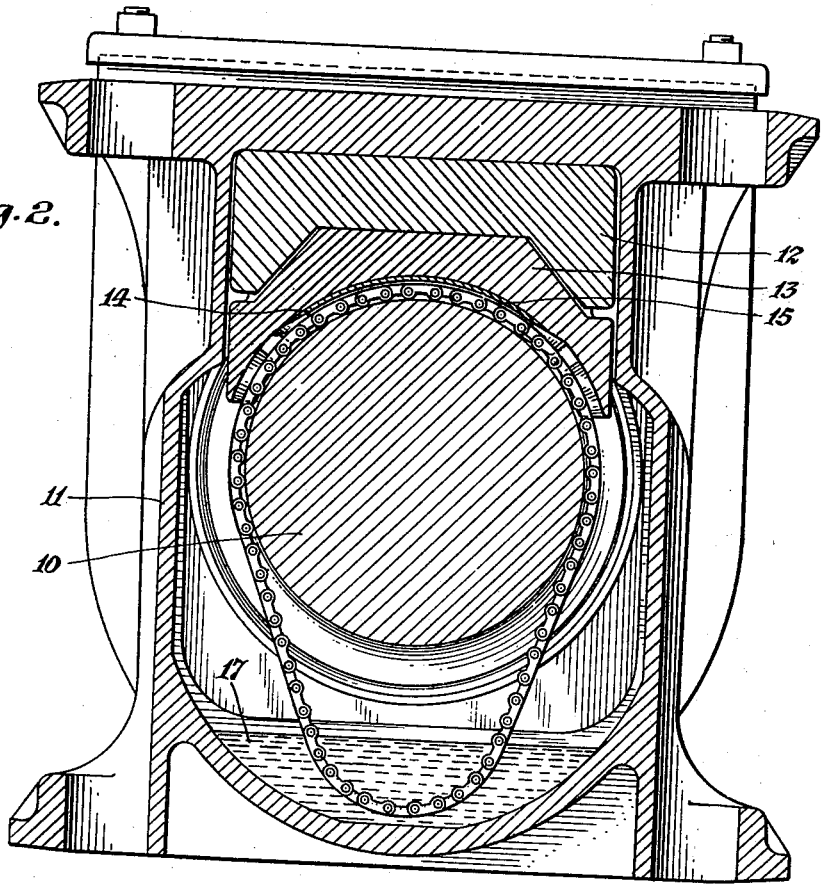
Figure 2 is a vertical section through the box taken along the line 2—2 of Figure 1.

Referring now to the drawings, one embodiment of the invention as applied to a plain bearing box is illustrated. Over the end of the journal 10 there is applied a box 11 which has preferably such standard outside dimensions as to be adapted to fit into standard frames designed for plain bearing boxes. In lieu of forming the journal box as a separate unit it might be formed as an integral part of a standard side frame structure, if desired. Between the under surface of the top of the box and the top of the journal there is provided a wedge 12 and a brass 13 through which the load of the side frame of the car will be transmitted to the journal. The under surface of the brass which bears upon the axle is suitably lined with babbitt, or the like, as indicated at 14. About midway between the ends of the brass a groove 15 is provided transversely of the same. This, as indicated in Figure 1, is primarily cut into the babbitt lining but at points, particularly at the sides of the brass, is also cut into the metal of the brass itself. A chain 16 is supported by the journal in the plane of the groove 15 and forms a comparatively snug fit with the side walls of the groove at the top of the journal. Just sufficient clearance should be provided in the groove to permit free movement of the chain through it. Clearance between the top of the chain and the groove should be great enough to allow for some wear of the babbitt. The lower portion of the chain dips into a bath of oil 17 carried in a reservoir at the bottom of the box.

Chain 16 raises oil from the oil reservoir and delivers it to the bearing surfaces of the journal and brass.

Figure 3:
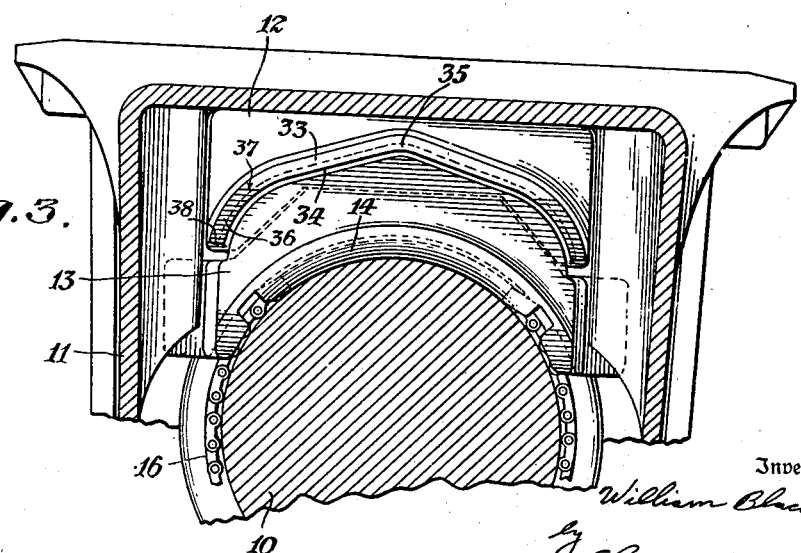
Figure 3 is a vertical section taken through a portion of the box along the line 3—3 of Figure 1.

To prevent the leakage of oil from the box at the inner end where a comparatively large opening is required around the journal, there is provided an obturating ring 31 having a sleeve portion pressed over a part of the journal and having an outwardly flared portion extending into the box. This ring is rotated with the journal and passes through the space provided between an extension 32 of the brass and an extension 33 of the wedge. The under surface of the wedge extension, as best shown in Figure 3, is in the form of a Gothic arch 34 having a peak 35. The sides of the arch slope rather abruptly from this peak so that the tendency of the oil to accumulate and remain at the top of the surface 34 is overcome. If the surface 34 were a portion of a cylinder, instead of being peaked as shown, oil would collect at the top and would drip directly therefrom. Some of this would fall upon the outer surface of the ring 31 and would find its way out along the journal. On the other hand any oil which is thrown against the peaked surface during the rotation of the journal will flow quickly to one side or the other down to the lower edge 36. This, furthermore, as indicated in Figure 1, is inclined downwardly and toward the center of the box from an upper corner 37 to a lower corner 38. Therefore, any oil thrown against the surface 34 will flow freely and quickly down to the point 38 from which it will drop onto the brass and find its way back to the oil reservoir. The danger of dropping oil from the top of the box or the wedge onto the outer face of the obturating ring will in this way be obviated. A sealing member 39 surrounds the sleeve of the obturating ring and fits into a recess in the inner end of the box so as to prevent the access of dust and also assist in preventing the escape of oil.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a plain bearing journal box structure a box having an oil reservoir and adapted to receive the end of a journal, a brass carried by said journal, a wedge between the brass and said box, means for distributing lubricant from said reservoir along said journal, a shield carried by said journal adjacent the inner end of said box, and a ledge whose under surface is formed with a sharp peak formed by downwardly sloping, intersecting faces formed on said wedge adjacent said shield arranged to return to said reservoir oil thrown against said surface.

2. In a plain bearing journal box structure, a box member having an oil reservoir and adapted to receive the end of a journal, a brass carried by said journal, a wedge member between the brass and box member, means for distributing lubricant from said reservoir along said journal, and an oil shield carried by said journal in rear of said brass, one of said members having surfaces thereon, in the top portion of said box member located partly in the plane of rotation of said oil shield and partly forwardly thereof and extending downwardly adjacent the sides of said box member, portions of said surfaces being flared outwardly in an axial direction and joining other portions of said surfaces adjacent the sides of said box, sloping downwardly and forwardly, said first named portions of said surfaces being adapted to receive oil thrown by said oil shield and to deliver said oil to said other portions of said surfaces, said other portions of said surfaces being arranged to direct the flow of said oil forwardly in said box member and to deliver it to the bottom of said box member forwardly of the plane of said oil shield.

3. In a plain bearing journal box structure, a box having an oil reservoir and adapted to receive the end of a journal, a wedge member between the brass and box, means for distributing lubricant from said reservoir along said journal, and an oil shield carried by said journal in rear of said brass, said wedge having surfaces thereon located partly in the plane of rotation of said oil shield and partly forwardly thereof, and extending transversely across said box above said journal and downwardly adjacent the sides of said box, said surfaces being so constructed and arranged as to direct the flow of oil thrown against any portion of them by said oil shield downwardly and forwardly of said box and to discharge said oil into the bottom of said box forward of the plane of said oil shield.

4. In a plain bearing journal box structure, a box having an oil reservoir and adapted to receive the end of a journal, a wedge member between the brass and box, means for distributing lubricant from said reservoir along said journal, and an oil shield carried by said journal in rear of said brass, said wedge having surfaces thereon located partly in the plane of rotation of said oil shield and partly forwardly thereof, and extending downwardly adjacent the sides of said box, portions of said surfaces being flared outwardly in an axial direction and joining other portions of said surfaces sloping downwardly and forwardly, said first named portions of said surfaces being adapted to receive oil thrown by said oil shield and to deliver said oil to said other portions of said surfaces, said other portions of said surfaces being arranged to direct the flow of said oil forwardly in said box and to deliver it to the bottom of said box forwardly of the plane of said oil shield.

WILLIAM BLACKMORE.